United States Patent

[11] 3,621,295

[72] Inventor John E. Callan
 Milwaukee, Wis.
[21] Appl. No. 839,517
[22] Filed July 7, 1969
[45] Patented Nov. 16, 1971
[73] Assignee Allen-Bradley Company
 Milwaukee, Wis.

[54] CONTROLLED RECTIFIER-FIRING CIRCUIT
 6 Claims, 1 Drawing Fig.
[52] U.S. Cl. .................................................. 307/252 W,
 307/252 Q, 318/345
[51] Int. Cl. ...................................................... H03k 17/00
[50] Field of Search .......................................... 307/252.53,
 252.70, 252.72, 252.90, 305; 318/34 S

[56] References Cited
 UNITED STATES PATENTS
 3,293,449 12/1966 Gutzwiller ..................... 307/252

Primary Examiner—Donald D. Forrer
Assistant Examiner—John Zazworsky
Attorneys—Thomas O. Kloehn and Arthur H. Seidel ABSTRACT: A control circuit for a DC motor has a power SCR connected between the DC motor and AC source. A sensitive SCR is connected across the power SCR and the gate of the power SCR to fire it. The sensitive SCR is triggered by a conventional trigger signal source. A voltage-limiting Zener diode is connected across a sensitive SCR, and the parallel connected Zener diode and sensitive SCR are connected through a relatively large current-limiting resistor and a rectifier diode to the AC source.

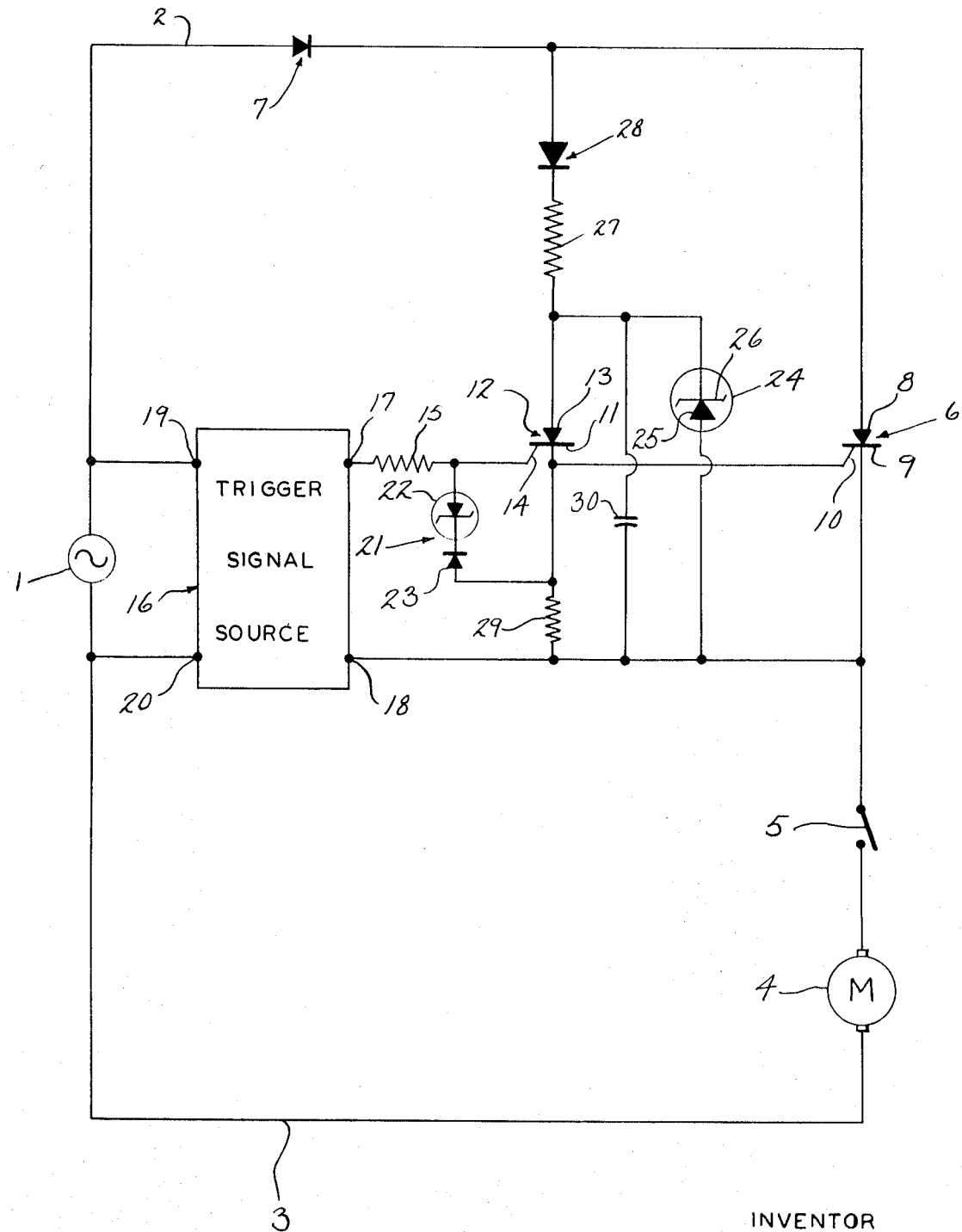

3,621,295

CONTROLLED RECTIFIER-FIRING CIRCUIT

BACKGROUND OF THE INVENTION

The manifold advantageous characteristics of power SCR's are such that power SCR's have largely replaced other control devices for the control of a wide range of diverse loads on AC lines. Power SCR's are now in use that have voltage ratings as high as 1,200 volts, and as power SCR's with higher ratings are developed the field of applicability of power SCR's is expanded.

Also, as the ratings of power SCR's are increased, a corresponding increase in firing current to trigger the power SCR's is required. The increase in firing current generates a need for new firing circuits capable of producing the necessary firing current with sufficient economy of size and cost so as not to nullify the advantages sought in using power SCR's. A typical power SCR firing circuit is illustrated in General Electric application note 200.19, page 11, FIG. 12. There a sensitive SCR is connected in parallel with the power SCR and the cathode of the sensitive SCR is connected to the gate of the power SCR. The gate of the sensitive SCR is connected to a trigger signal source, which triggers the sensitive SCR to fire the power SCR. Utilization of that circuit is limited by the maximum voltage ratings available for sensitive SCR's, as well as by the cost of sensitive SCR's with higher voltage ratings. For example, a sensitive SCR with a voltage rating of 400 volts cannot be used in such a circuit with a high voltage power SCR, if the peak voltage on the powerline exceeds 400 volts. Even if the peak voltage on the powerline is less than 400 volts, the cost of sensitive SCR's having a sufficiently high-voltage rating may still prohibit their use in many applications. The common expedient in both situations is to employ a voltage step-down transformer to reduce the voltage drop across the sensitive SCR. However, the addition of a transformer not only adds to the cost of the firing circuit, but it virtually multiplies the size and weight of the firing circuit and in many potential applications for power SCR's this latter result is unacceptable. What is needed is a firing circuit that is extremely economical, not only as to cost, but also of space and weight requirements.

SUMMARY OF THE INVENTION

The present invention relates to a firing circuit for a controlled rectifier, and more specifically the invention resides in the combination of a power-controlled rectifier that is connected between a power source and a load and that has a gate adapted to receive a firing signal to render it conductive, a firing-controlled rectifier that is connected across the power-controlled rectifier and it has its cathode connected to the gate of the power-controlled rectifier to fire the power-controlled rectifier and a gate connected to a trigger signal source that provides a controlled-trigger signal for rendering the firing-controlled rectifier conductive, and a breakover diode that is connected across the firing-controlled rectifier and that has a breakover voltage no greater than the voltage rating of the firing-controlled rectifier.

The foregoing combination provides a firing circuit for a power SCR that satisfies the need for economy in cost, size and weight. This circuit allows the utilization of sensitive firing SCR's that have voltage ratings substantially less than the line voltage controlled by the power SCR's without the addition of a voltage stepdown transformer. This is achieved by the use of the breakover diode which fires on each half cycle when the line voltage exceeds the present value less than the voltage rating of the sensitive SCR. This invention provides a low cost, compact, lightweight, high-voltage firing circuit that allows the design engineer a broad range of alternatives capable of meeting the specifications of a great many applications that hitherto would have been impossible or impractical to satisfy.

BRIEF DESCRIPTION OF THE DRAWING

The drawing is a schematic diagram embodying the power SCR firing circuit of the present invention.

DESCRIPTION OF THE PREFERRED EMBODIMENT

An AC power source 1 is connected by power lines 2 and 3 to power a DC motor 4. A starting contact 5 is connected in series with one terminal of the DC motor 4 to energize the motor 4. In the case of the large DC motor the starting contact 5 would probably be an electromagnetically operated contactor, whereas in a household appliance it may be a manually operated switch. Similarly the AC source 1 may be single phase or multiphase depending upon the application, and though it is represented here as a single-phase source, those skilled in the art will known how to adapt this invention to a multiphase source. The DC motor 4 is one of many different kinds of loads that may appear across lines 2 and 3, another of which might be a lighting circuit, or still another could be a heating element.

A power SCR 6 and a rectifier diode 7 are connected in series between the AC source 1 and the motor 4 through the starting contact 5. The power SCR 6 has an anode 8 connected to the AC source 1, a cathode 9 connected to the motor 4, and a gate 10 which receives a firing signal to render the power SCR conductive. It is characteristic of a controlled rectifier, such as the power SCR 6, that once it is fired into a conductive state, the gate 10 has no further control over it until it is turned off, i.e., rendered nonconductive, once again by a change in polarity across its anode-8-to-cathode-9 circuit.

The gate 10 on the power SCR 6 is connected to a cathode 11 of a sensitive, firing SCR 12 which is connected across the power SCR 6. The sensitive SCR 12 is a controlled rectifier with the same control characteristics as the power SCR 6, but the sensitive SCR 12 will be triggered to a conductive state by a much smaller signal than is required by the power SCR 6. (For the purpose of this disclosure the control signal to the power SCR 6 is referred to as a firing signal, and the control signal to the sensitive SCR 12 is called a trigger signal. This choice of words is purely arbitrary, the only necessary difference between the control signals to the power SCR 6 and the firing SCR 12 being the sizes or magnitudes of the signals.) The firing SCR 12 has its anode 13 connected to the source 1 and its cathode 11 connected to the motor 4.

A gate 14 of the firing SCR 12 is connected through a resistance 15 to a terminal 17 of a controllable trigger signal source 16. Another output terminal 18 of the trigger signal source 16 is connected to the cathode 11 of the firing SCR 12. The trigger signal source 16 input terminals 19 and 20 are connected across the AC source 1 which provides power for the trigger signal source 16. A gate signal limiting circuit 21 which is made up of series connected Zener diode 22 and blocking diode 23, is connected across the gate 14 to anode 13 circuit of the firing SCR 12 for protective purposes. The trigger signal source 16 may be any one of the conventional circuits commonly used and it will include some means for controlling the firing angle of the sensitive SCR 12 which controls the firing angle of the power SCR 6 to control the average power supplied to the load 4.

A Zener diode 24, which is a device variously known as a breakdown diode or an avalanche diode, is connected across the firing SCR 12 with its cathode 26 connected to the anode 13 of the firing SCR 12 and its anode 25 connected to the cathode 11 of the firing SCR 12. A large current-limiting resistance 27 and a blocking diode 28 are connected in series between the AC source 1 and the parallel-connected firing SCR 12 and Zener diode 24, for reasons that appear in the description of the operation of this circuit. A drop resistor 29 is connected in series with the cathode 11 of the firing SCR 12 so as to be in the gate-10-to-cathode-9 circuit of the power SCR 6.

A capacitor 30 is connected across the firing SCR 12 and the breakover diode 24 to provide additional firing current to the gate 10 of the power SCR 6. A blocking diode, such as the blocking diode 28, between the capacitor 30 and the power-line 2 is necessary to the effective functioning of the capacitor 30 in this circuit. During the forward half cycles conducted by the blocking diode 28, the capacitor 30 is charged. When the firing SCR 12 is triggered to conduct, the capacitor 30 discharges through the firing SCR 12, adding its discharge current to the normal line current to fire the power SCR 6. If there were no blocking diode, such as the blocking diode 28, and no rectifier diode 7 in the circuit, the capacitor 30 would charge one way during one-half cycle and discharge and recharge in the opposite polarity during the next half cycle. Also in the absence of the blocking diode 28, the capacitor 30 could discharge through the anode-8-to-cathode-9 circuit of the power SCR 6 to distort the proper control of the power SCR 6.

In one proposed application of this embodiment of the invention, the powerlines 2 and 3 carry 240 volts AC and the power SCR 6 is a 400 volt, 10 ampere rated power SCR 6. The firing SCR 12 has a 200 volt rating and the Zener diode 24 the 100 volt rating. The drop resistor 29 is a 100 ohm resistor and the current-limiting resistance 27 is a 1k ohm resistor. The motor 4 is a DC motor in the 1/12 to 1.5 hp. range. The specific circuit parameters will vary, of course, with the components available and the varying design considerations depending upon the application of the circuit. If cost economy is the primary inducement for using this circuit, then the Zener diode 24 will be selected to have a breakover voltage of 10 percent or less of the peak voltage on the lines 2 and 3, so that the voltage rating of the firing SCR 12 may be minimized with resulting cost saving. Where other considerations enter the picture the breakover voltage rating of the Zener diode 24 may be increased up to 50 percent or more of the peak voltage on the lines 2 and 3. As the breakover voltage rating of the Zener diode 24 approaches the peak voltage on the lines 2 and 3 the economic advantage obtained from the use of this circuit diminishes. However, even as the breakover rating of the Zener diode 24 approaches relatively closely to the peak voltage across the lines 2 and 3, the use of the present invention may still obviate the need for a transformer and that alone could make the present invention virtually indispensible in some applications.

The blocking diode 28 performs two other important functions. First, it blocks current flow in the forward voltage direction of the Zener diode 24 to eliminate the existence of a shunt path for that half cycle of the alternating current from the AC source 1. Secondly, the blocking diode 28 also blocks reverse voltages that would otherwise appear across the firing SCR 12 so that the reverse voltage rating of the firing SCR 12 may be minimized. In the circuit of the preferred embodiment as diagrammed in the drawing, the blocking diode 28 is in some respects redundant with the rectifier diode 7, but if the power on the powerline 2 is not rectified, the blocking diode 28 would be essential to the performance of the functions mentioned.

The function of the current-limiting resistance 27 is as important as that of the blocking diode 28. The size of the current-limiting resistance 27 is calculated to provide only that amount of current necessary for a firing signal for the power SCR 6. Thus, the firing circuit for the SCR 6 draws no more current then is necessary for its essential purpose. When the firing SCR 12 is held in a nonconductive state by the controllable trigger signal source 16, the Zener diode 24 will nevertheless breakover and conduct half cycles when the line voltage on the powerlines 2 and 3 exceeds the Zener breakover voltage. The ultimate purpose of the controllable trigger signal source 16 is to control the operation of the motor 4, so that when the trigger signal source 16 does not trigger the firing SCR 12 the intent is to minimize the power to the motor 4. If a large current is allowed to flow through the Zener diode 24, control of the DC motor 4 will be lost. Hence, the current-limiting resistance 27 serves to minimize the current flow through the Zener diode 24 when the firing SCR 12 is not conducting to the point where the power thus transmitted to the DC motor 4 will not be sufficient to overcome its friction and the motor 4 will remain stationary. The amount of the leakage current that will then be allowed to pass through the firing circuit when the power SCR 6 is to be held nonconductive is thus determined by the tolerance of the particular load being controlled and the desired control and operation of the load.

The foregoing written description of the invention sets forth the manner and process of making and using the invention in sufficiently full, clear, concise, and exact terms to enable any person skilled in the art to which it pertains to make and use it, and it also sets forth the best mode presently contemplated by the inventor for carrying out his invention. By contrast, the claims that follow particularly point out and distinctly claim the subject matter which the applicant regards as his invention.

I claim:

1. A firing circuit for a controlled rectifier comprising the combination of a power-controlled rectifier having an anode and cathode connected between the power source and a load, and having a gate adapted to receive a firing signal to render it conductive;

a firing-controlled rectifier connected in parallel with said power-controlled rectifier between said power source and said load, having a cathode connected to said gate of said power-controlled rectifier and connected through a voltage drop resistance to said cathode of said power-controlled rectifier, and having a gate connected to trigger signal source for rendering it conductive;

a breakover diode connected in parallel with said firing-controlled rectifier and having a breakover voltage less than the peak voltage across said power source and no greater than the voltage rating of said firing-controlled rectifier;

a blocking diode connected in series with said firing-controlled rectifier and said breakover diode to block reverse voltages to said firing-controlled rectifier and to block the forward conducting path through said breakover diode;

and a current-limiting resistance connected between said power source and said firing-controlled rectifier and breakover diode to limit power through said firing-controlled rectifier.

2. A firing circuit for a controlled rectifier as set forth in claim 1, wherein a capacitor is connected across said firing-controlled rectifier and said breakover diode in series with said blocking diode.

3. A firing circuit for a controlled rectifier as set forth in claim 2, wherein said breakover voltage of said breakover diode is no more than 50 percent of the peak voltage across said power source.

4. A firing circuit for a controlled rectifier as set forth in claim 3, wherein said breakover voltage of said breakover diode is less than 10 percent of the peak voltage across said power source.

5. A firing circuit for a controlled rectifier as set forth in claim 4, wherein starting contacts are connected in series between said load and said power source.

6. A firing circuit for a controlled rectifier as set forth in claim 5, wherein said power source is an AC source;
   and said load is a DC motor.

* * * * *